Jan. 13, 1925.
R. C. ALLEN
1,522,480
METHOD OF SOLVENT RECOVERY
Filed March 3, 1921   2 Sheets-Sheet 1
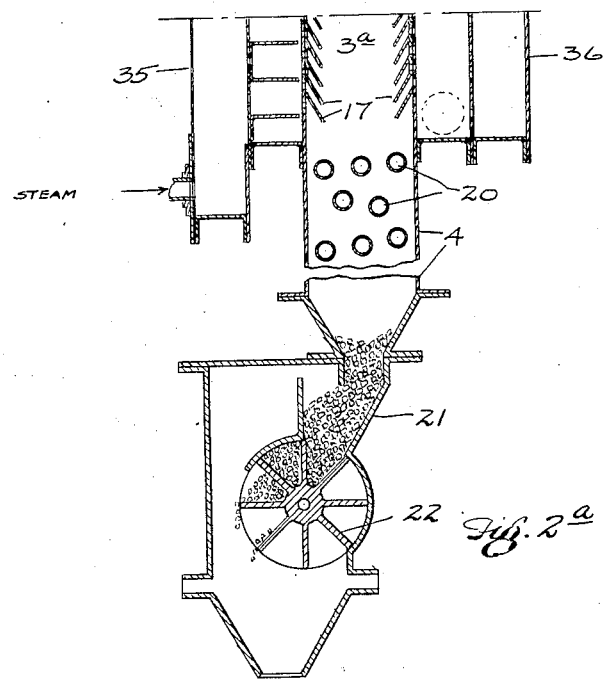
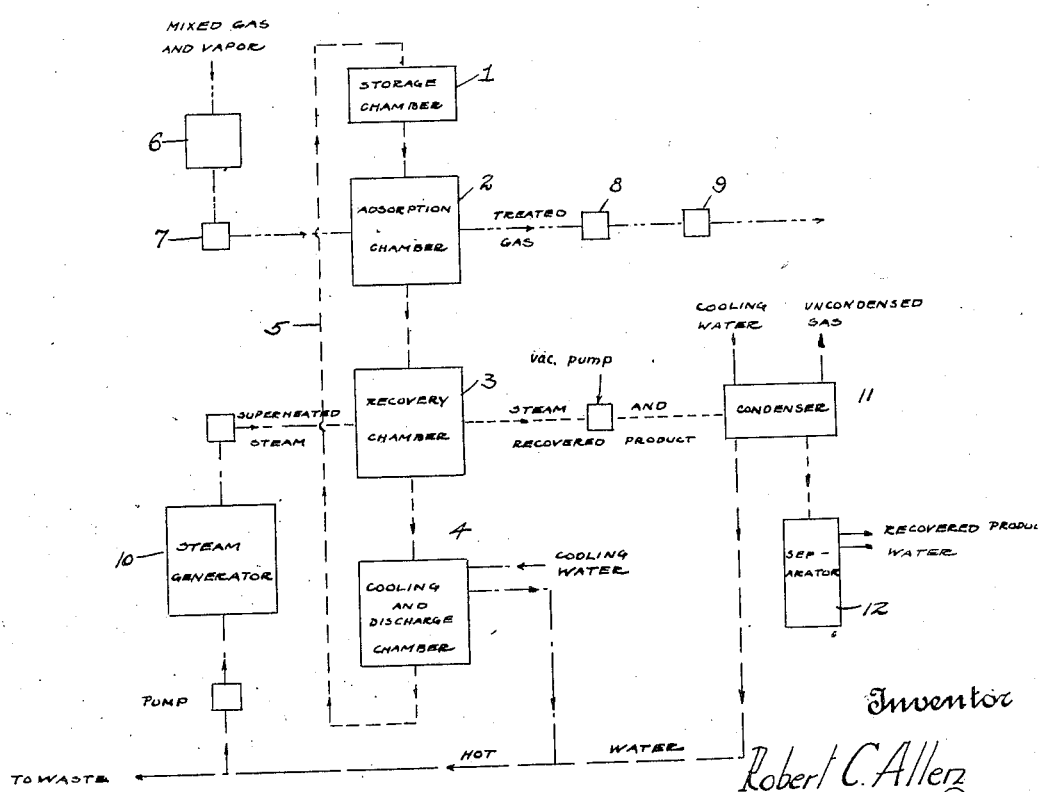

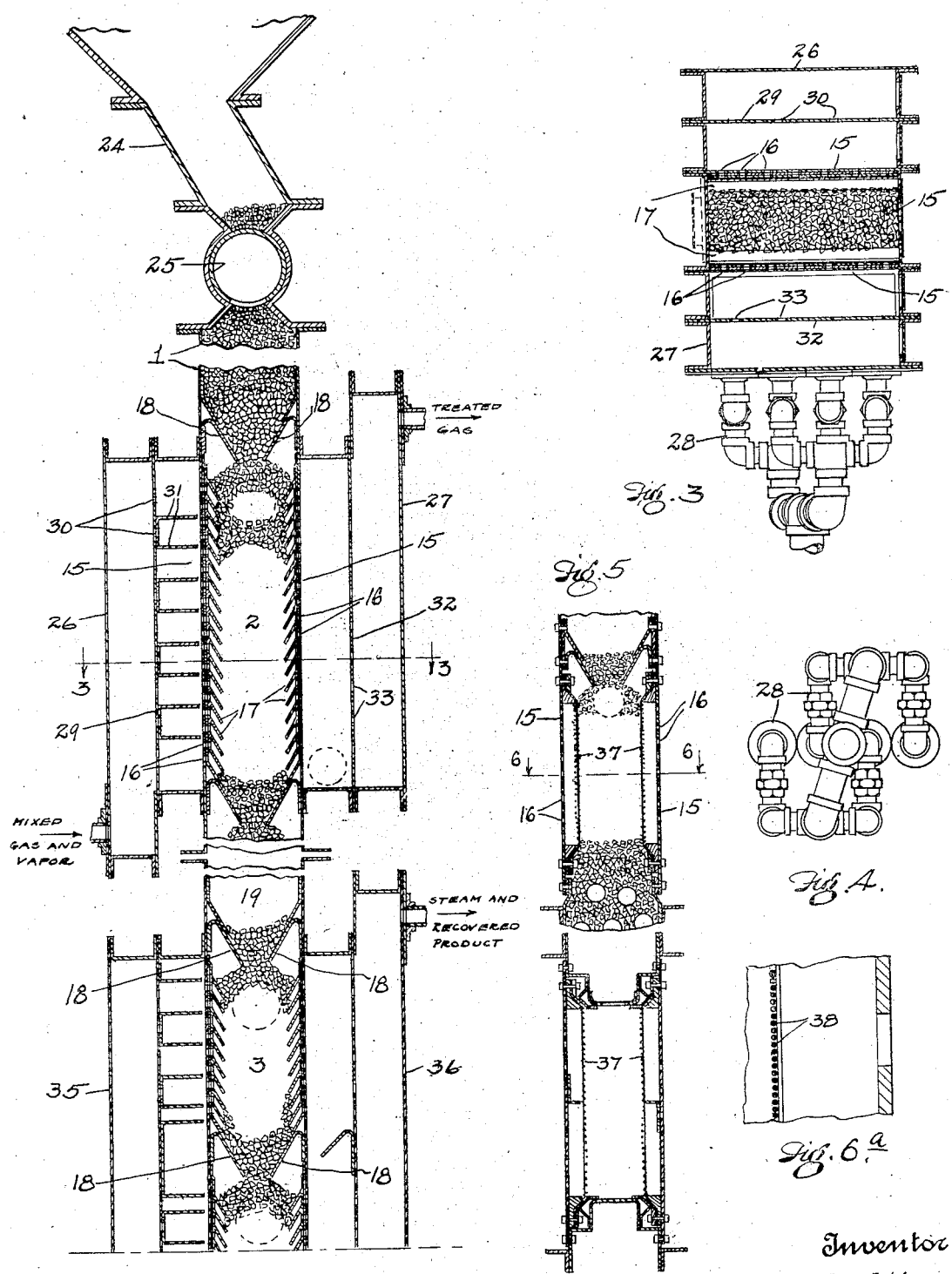

Patented Jan. 13, 1925.

1,522,480

UNITED STATES PATENT OFFICE.

ROBERT C. ALLEN, OF LAKEWOOD, OHIO, ASSIGNOR TO HENRY L. DOHERTY & COMPANY, OF NEW YORK, N. Y.

METHOD OF SOLVENT RECOVERY.

Application filed March 3, 1921. Serial No. 449,551.

*To all whom it may concern:*

Be it known that I, ROBERT C. ALLEN, a citizen of the United States, and a resident of Lakewood, county of Cuyahoga, and State of Ohio, have invented a new and useful Improvement in Methods of Solvent Recovery, of which the following is a specification, the principle of the invention being herein explained and the best mode in which I have contemplated applying that principle, so as to distinguish it from other inventions.

The present improved method and apparatus, relating, as indicated, to solvent recovery, should be understood as comprehending generally the extraction or adsorption of vapors, and particularly of the vapors of volatile hydrocarbons from admixtures thereof with air or other gases. Thus in various manufacturing processes, involving the use of benzene and other similar solvent agents, considerable quantities of such agents ordinarily are converted into vapor form and so lost. It has also been found that a considerable quantity of naphtha and high test gasoline are present in the form of vapors in commercial natural gas, and the recovery and liquefaction of such vapors has become an important phase of the industry.

The availability of solid, more or less pulverulent adsorbent materials for use in the recovery of vapors of the character just referred to is known, foremost among such materials perhaps being the so-called "activated" carbon or charcoal, developed during the recent war for use in gas masks, to remove from the atmosphere the poisonous gases used in chemical warfare. Another such material is silica gel, and a variety of less active materials exist.

The object of the present invention is to provide a method and apparatus for recovery of vapors such as hereinbefore referred to in a continuous or cyclic fashion, the adsorbent material being used over and over again without interrupting the operation. A further object is to increase the efficiency of the recovery, both by insuring the substantially complete adsorption of the vapors from the air or other gaseous medium with which they may be admixed, and similar complete extraction of the adsorbed vapors from the material, e. g. activated carbon, employed as the adsorbent agent. Superheated steam being the agent used to effect such extraction, provision is also made for the economical use of the steam, so that the extraction may be accomplished with a minimum expenditure of power.

To the accomplishment of the foregoing and related ends, the invention, then, consists of the means and steps hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Fig. 1 is a diagram showing, after the fashion of a flow sheet, the arrangement of apparatus and successive steps under the process exemplified in the operation of such apparatus; Figs. 2 and 2ª show a central vertical cross-section of the principal element of such apparatus which consists of a vertical column divided into sections forming an adsorption chamber, recovery chamber, and cooling and discharge chamber; Fig. 3 is a transverse section of such apparatus taken on the plane indicated by the line 3—3, Fig. 2; Fig. 4 is a side elevational view of a detail of piping shown in plan in Fig. 3; Fig. 5 is a broken section corresponding with that of Fig. 2, showing a modified construction of recovery chamber; Fig. 6 is a transverse section; and Fig. 6ª an enlarged transverse section of such modified construction, taken on the plane indicated by the line 6—6, Fig. 5.

As indicated in connection with the general description of the drawings, the central element of the apparatus consists of a series of chambers through which the adsorbent material is caused to pass in a downward direction under gravity. Thus referring to Fig. 1, such material passes from a storage hopper 1 through the adsorption chamber 2 proper; thence through the recovery chamber 3; and finally to a chamber 4 in which the adsorbent material is cooled, and from which it is discharged or rather returned again to chamber 1 by means of suitable conveying or elevating mechanism 5 which is illustrated in diagrammatic fashion only in the drawings. It will be understood, however, that such return of the adsorbent material is preferably effected under cover, i. e. through a closed duct or conduit, and since the particular means employed for the purpose constitute no part of the invention, detailed illustration has been omitted from the drawings.

The mixture of gases, including the vapor to be recovered, is admitted for treatment in adsorbent chamber 2 through a suitable temperature reducing chamber 6 and meter 7, entering said chamber 2 on one side and passing out on the other side, a vacuum pump 8 and booster 9 being included in the line beyond said chamber 2 where natural gas, for example, is being treated to recover gasoline, so that a proper rate of flow through the adsorption apparatus may be maintained and the treated gas supplied to the city mains under proper pressure.

The superheated steam employed in the recovery chamber is obtained from a suitable generator 10, and the resultant mixture of steam with recovered volatile product is conducted from the recovery chamber, through a vacuum pump as shown in Fig. 1, to a condenser 11, the condensate thence passing to a separator 12. The cooling water employed in the condenser is collected along with that employed in the cooling chamber 14, and used, so far as needed, in the steam generator 10, the excess going to waste.

The several chambers 2, 3 and 4, consist, as previously indicated, of successive sections of a continuous, vertically disposed chamber or passage, as shown in central vertical section in Figs. 2 and 2ª, such passage being designed to be more or less filled with a column of the particular adsorbent material employed in the process. Such passage or succession of chambers is preferably of the rectangular form in cross-section shown in Fig. 3, the walls 15 consisting of metal plates or sheets suitably riveted or otherwise fastened together, and the pair of opposite walls having the greater width being formed with perforations 16 for the passage of gas or steam transversely through the corresponding section of the passage which forms either the adsorption or recovery chamber, as the case may be. The walls that are thus perforated are also provided interiorly with a series of downwardly directed flanges that serve to shield the perforations 16, and thus prevent the material from entering and clogging same, as will be readily understood. The portions of the walls between the sections of the passage thus constituting the successive chambers 2, 3 and 4, as well as the walls of chamber 4 itself, are imperforate. The interposition of inclined flanges 18 at the upper and lower ends of sections 2 and 3, such flanges more closely constricting the passage than do flanges 17, serves to mark off these chambers and to leave therebetween an intermediate chamber 19 in which the accumulated material acts as a plug or seal to prevent the gases from either chamber 2 or 3 finding their way to the other such chamber.

The chamber 3 as a matter of fact extends below the lower flanges 18, just referred to as defining the same, to provide a lower adsorption chamber 3ª, which communicates directly with the cooling chamber 4. A series of cooling coils 20 through which water or like cooling medium is circulated, serves to lower the temperature of the material to the desired point as it passes through said chamber 4 into a discharge hopper 21 where a rotary valve 22 or like device is employed to remove the material at the proper rate, while still keeping the lower end of chamber 4 sealed. As previously described, the material is then returned, by a suitable conveying or elevating mechanism, to the upper end of the passage or succession of chambers. Here it is received in a suitable feed hopper 24 from which it is transferred at a rate corresponding with that of its discharge from chamber 4 by means of a suitable feed valve 25 to the storage chamber 1.

Laterally adjacent the perforated sections of walls 15 that mark the extent of chamber 2, are supplemental chambers 26 and 27 completely enclosing such perforated sections. The mixture of gas and vapor to be treated is received in said chamber 26, through a branched piping connection 28 (shown in detail in Figs. 3 and 4), whereby such gases are distributed uniformly transversely of such chamber, and further distribution thereof so as to insure an equal pressure throughout the extent of the adjacent perforated wall 15 is secured by interposing in the chamber a vertical partition wall 29 having perforations 30 that are separated from each other by inwardly directed transversely disposed partitions 31. The chamber 27 is likewise provided with a vertical partition wall 32 having perforations 33, and a branched system of collector pipes (not separately shown) similar to piping 28 is utilized to draw off the gases from said chamber 27.

The perforated sections of walls 15 that form a part of chamber 3 are similarly laterally enclosed by means of chambers 35 and 36, the construction of which is subtantially identical with that of chambers 26 and 27, and so need not be described in detail. It will further be understood that branched distributor and collector pipe, similar to piping 28, is used to supply steam to and withdraw the same from chambers 35 and 36 respectively.

In Figs. 5 and 6 I show, by way of modification, the substitution of screen walls 37 for the flanges 17 that form a feature of chambers 2 and 3 in the first described construction. These screen walls 37 are supported in suitably spaced relation from the perforated walls 15, and consist of tightly strung horizontal and vertical wires or rods 38 which are not interwoven but simply lie flat against each other, as best shown in Fig. 6, such rods being brazed or welded together. It will be understood that the vertically disposed wires are the inner ones, which come in direct contact with the material, and so oppose the least resistance to the free movement of the material downwardly through the chamber.

In operation, a column of adsorbent material, such for example as activated charcoal, will be caused to continuously pass downwardly through chambers 2 and 3 in succession, such material being suitably cooled before it is admitted to said chamber 2. Simultaneously a continuous flow of the gaseous mixture that contains the vapors to be adsorbed is maintained through the portion of the column of material lying in said chamber 2. The rate of such gaseous flow being properly correlated with the rate of movement of the adsorbent material, it is possible to obtain a maximum degree of extraction of the desired vapors, and at the same time a maximum charge in the adsorbent material. The treated gas thence passes from the apparatus, while the adsorbent material thus charged passes from chamber 2 through the intermediate chamber 19 into recovery chamber 3. Here the material meets with a transversely flowing stream of superheated steam, the temperature of which is sufficiently high, and the rate of flow so gauged, that by the time the material reaches the lower end of said chamber 3 substantially all of the adsorbed vapors will have been driven off and carried with the steam to the condenser 11. The material thus freed of its charge of adsorbed vapors is then cooled in chamber 4 and returned to storage chamber 1 to repeat the cycle.

It should be explained that the flanges 18, particularly the lowermost ones, also function to alter the relative position of the particles composing the adsorbent material, the latter being turned over more or less so as to expose all such particles to the same steam treatment. In other words, the action is to bring the interior of the column of material beyond such flanges 18 into contact with the walls of the chamber where the steam enters.

It should also be noted that my improved apparatus and process may be operated in the extraction phase only to remove adsorbed vaporizable matters from material derived from a source entirely without such apparatus or process. Thus, for example, alcohol may be reclaimed from dregs, or from ground crude drugs, that have been treated in a percolator to extract essential oils or other ingredients. By allowing such material to pass my apparatus with the transverse passage of steam, such alcohol will be volatilized and carried off with the steam to be condensed and recovered by fractional distillation.

Other modes of applying the principle of my invention may be employed instead of the one explained, change being made as regards the means and the steps herein disclosed, provided those stated by any of the following claims or their equivalents be employed.

I therefore particularly point out and distinctly claim as my invention:—

1. In a process for recovering vapors or gases from an admixture thereof with other gases, the step which consists in passing the the mixture of gases to be treated transversely through a moving column of material capable of adsorbing such vapors or gases, substantially as described.

2. In a process for recovering vapors or gases from an admixture thereof with other gases, the steps which consist in passing the mixture of gases to be treated transversely through a moving column of adsorbent material at one point, and simultaneously treating such column at a point beyond such first point to drive off any adsorbed vapors.

3. In a process for recovering vapors or gases from an admixture thereof with other gases, the steps which consist in passing the mixture of gases to be treated transversely through a moving column of adsorbent material at one point, and simultaneously passing through such column at a point beyond such first point a medium capable of driving off any adsorbed vapors.

4. In a process for recovering vapors or gases from an admixture thereof with other gases, the steps which consist in passing the mixture of gases to be treated transversely through a moving column of adsorbent material at one point, and simultaneously passing steam through such column at a point beyond such first point.

5. In a process for recovering vapors or gases from an admixture thereof with other gases, the steps which consist in continuously circulating a body of granular, solid adsorbent material, passing a continuous current of the gases to be treated through such material at one point in its circuit, passing through such material at another point a continuous current of steam, and cooling such material at a point beyond such current of steam.

6. In a process for recovering vapors or gases from an admixture thereof with other gases, the steps which consist in continuously circulating a body of adsorbent material, passing a continuous current of the gases to be treated through such material at one point in its circuit, passing through such material at another point a continuous current of steam, passing water through suitable coils in contact with such material at a point beyond such current of steam, and using the resultant hot water in the generation of such steam.

7. In a process for recovering vapors or gases from an admixture thereof with other gases, the steps which consist in continuously circulating a body of adsorbent material, passing a continuous current of the gases to be treated through such material at one point in its circuit, passing through such material at another point a continuous current of steam, condensing such steam and admixed vapors by contact with water-cooled means, and using the resultant hot water in the generation of such steam.

8. In a process for recovering vapors or gases from an admixture thereof with other gases, the step which consists in passing transversely through a moving column of adsorbent material containing a volatilizable ingredient a medium capable of driving off the latter.

9. In a process for recovering vapors or gases from an admixture thereof with other gases, the step which consists in passing steam transversely through a moving column of adsorbent material containing a volatilizable ingredient, whereby the latter is driven off.

10. In a process for recovering vapors or gases from an admixture thereof with other gases, the step which consists in passing steam transversely through a moving column of adsorbent material containing a volatilizable ingredient, whereby the latter is driven off and simultaneously reversing the relative positions of the inner and outer particles of material composing such column.

Signed by me, this 1st day of March, 1921.

ROBERT C. ALLEN.